UNITED STATES PATENT OFFICE.

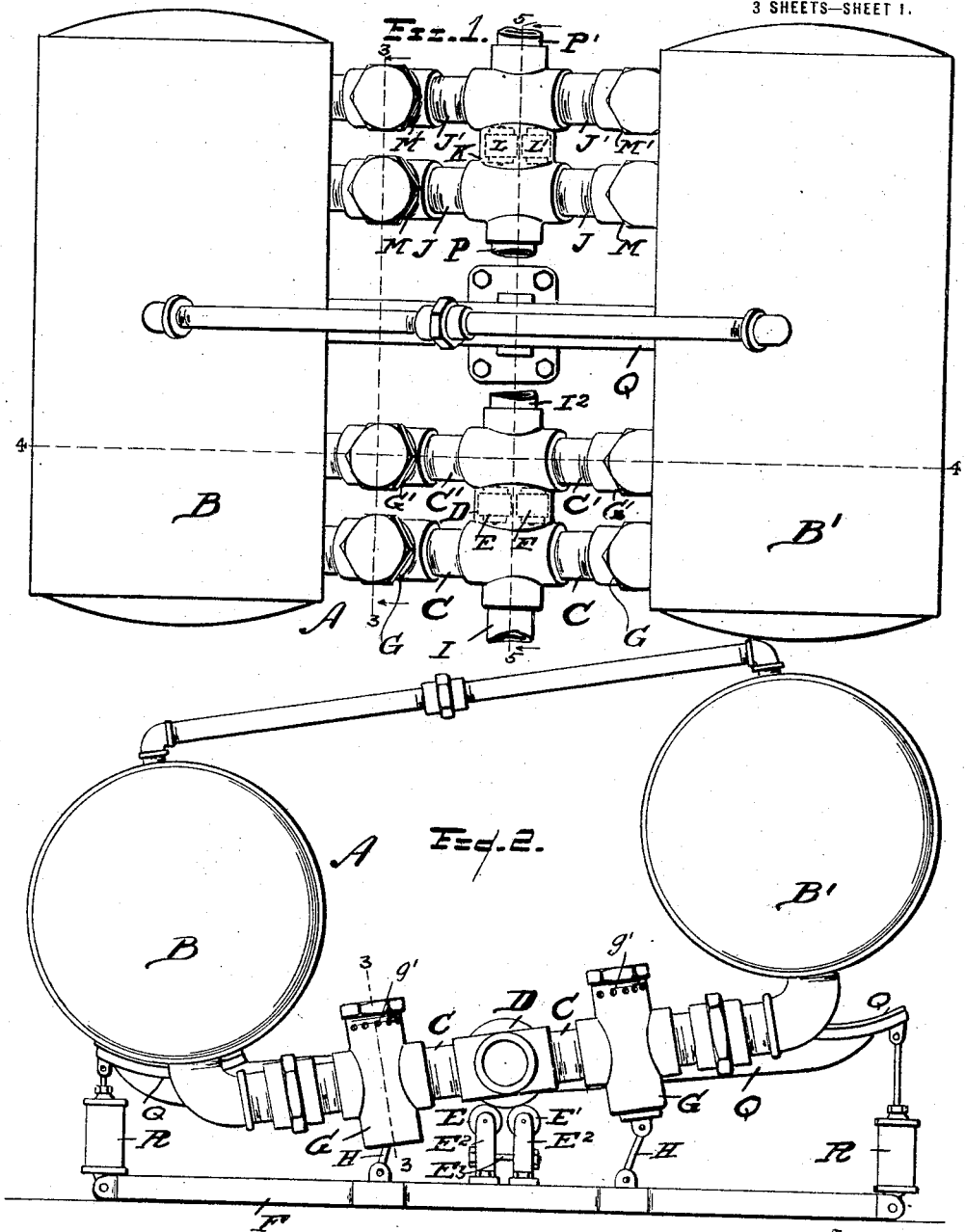

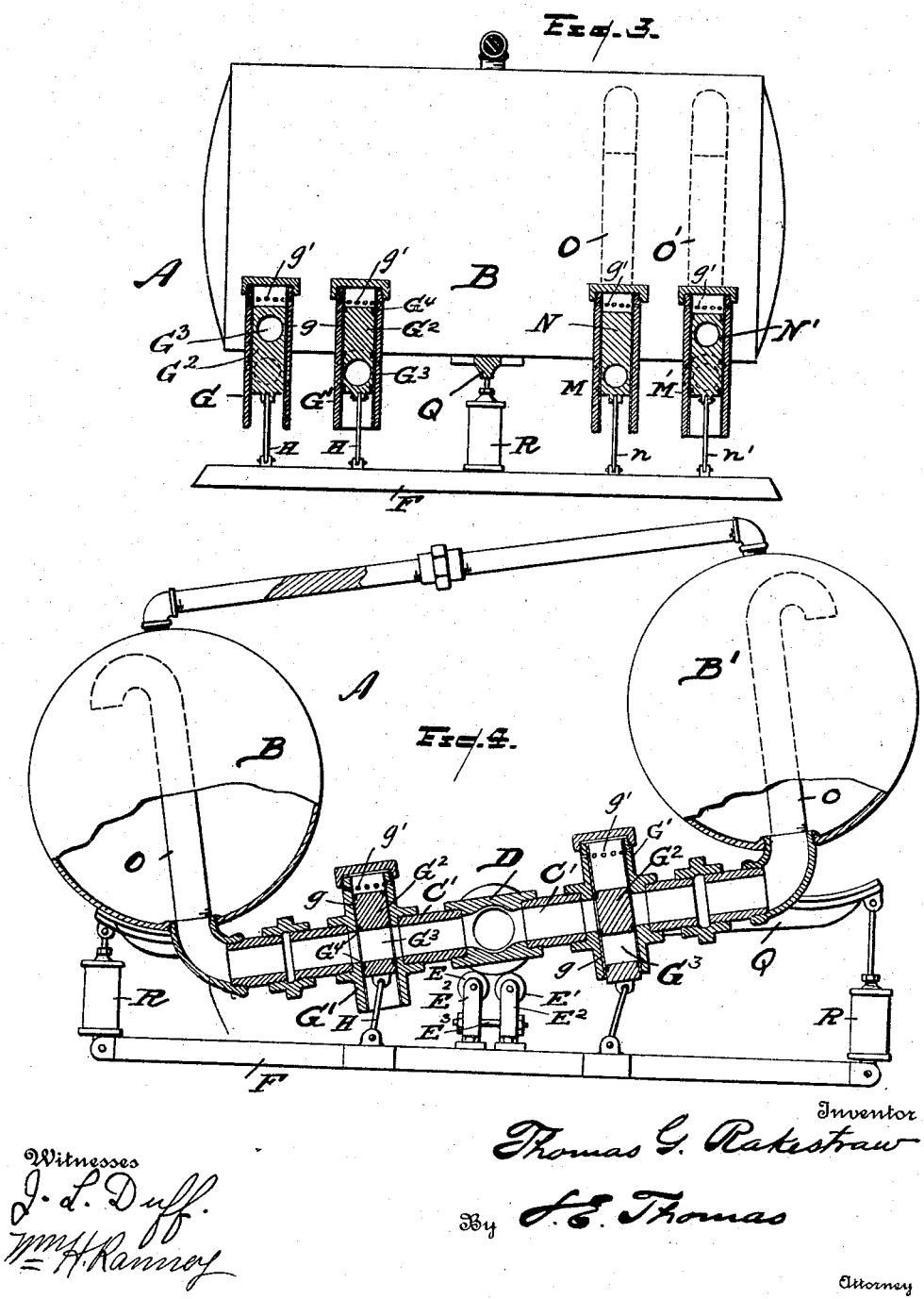

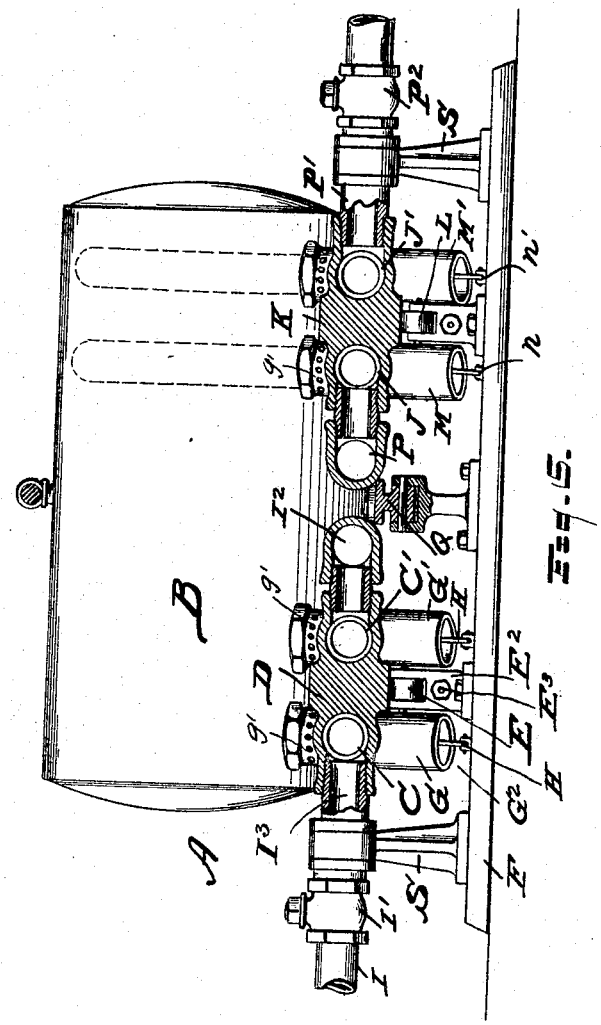

THOMAS G. RAKESTRAW, OF DETROIT, MICHIGAN.

STEAM-TRAP AND BOILER-FEEDER.

1,211,753.

Specification of Letters Patent.  Patented Jan. 9, 1917.

Application filed November 1, 1915.  Serial No. 58,986.

*To all whom it may concern:*

Be it known that I, THOMAS G. RAKE-STRAW, citizen of the United States, residing at Detroit, county of Wayne, State of Michigan, have invented a certain new and useful Improvement in Steam-Traps and Boiler-Feeders, and declare the following to be a full, clear, and exact description of the same, such as will enable others skilled in the art to which it pertains to make and use the same, reference being had to the accompanying drawings, which form a part of this specification.

My invention relates to steam traps of the twin-tank type shown in the accompanying drawings and more particularly pointed out in the following specification and claims.

One of the objects of my invention is to provide a trap adapted to return the condensation of a heating system to a boiler or to deliver feed water thereto, in which the usual hub valves of this type of trap are eliminated; also all levers and weights for controlling the operation of the valves usually employed in tilting traps. It is well known that the hub valves of this type of trap are open to may objections, among which may be mentioned the relatively large cost;—especially the larger sizes,—as the valves are made of brass. Another objection is the difficulty of properly packing this form of valve to provide against leakage.

One of the objects of the present invention is the employment of piston valves,— the cylinders of which may be brass lined,— so connected and arranged that the alternate tilting of the trap due to filling and emptying will serve to actuate the piston valves that condensation, or feed water, may be admitted to the trap and discharged alternately from each tank upon the alternate admission of steam and the discharge of its exhaust therefrom.

Other advantages and improvements will hereafter appear.

In the drawings accompanying this specification: Figure 1 is a plan view of the trap. Fig. 2 is an end elevation of the same. Fig. 3 is a longitudinal sectional view on lines 3—3 of Figs. 1 and 2, looking in the direction of the arrows. Fig. 4 is a cross-sectional view on line 4—4 of Fig. 1, showing the tanks partly in section and partly in elevation. Fig. 5 is a longitudinal sectional view on line 5—5 of Fig. 1, looking in the direction of the arrows.

Referring now to the letters of reference placed upon the drawings: A, denotes the trap or boiler feeder, installed above the boiler (not shown), that the water discharged from the trap may pass by gravity to the boiler.

B, B', are tilting twin tanks supported at one end upon the elbow connections of the water inlet and discharge pipes C, C', in turn projecting from the rocking fitting D.

E, E', are roller bearings, upon which the fitting D, tilts, journaled in the brackets $E^2$, $E^2$, bolted to the base plate F.

$E^3$, is a rod connecting the brackets to provide against spreading of the latter.

G, G', denotes the cylinders of a pair of piston valves in line with the respective pipes C, C', and which are preferably provided with a lining of brass $g$, and radial air vents $g'$.

$G^2$ designates a piston housed in the cylinders $g$ and $g'$.

$G^3$, indicates a transverse port for the passage of water through the piston, and $G^4$, are piston rings.

H, denotes a connecting rod pivoted to the respective pistons, its opposite end being connected with a bracket secured to the base plate F.

I, indicates an inlet pipe to conduct condensation or feed water to the fitting D, and I', denotes a check valve adapted to close against the return of the feed water.

$I^2$, indicates a pipe connecting the discharge pipes C', through the fitting D, with the boiler. It will be noted upon reference to Fig. 5, that the fitting D, with which the respective pipes C, and C', and the pipes I, and $I^2$, are connected, is divided by a wall D' separating the pipe connections C, and C', that the water delivered to the fitting may first pass to the tank before returning through the fitting to the pipes C', and $I^2$, and thence to the boiler. The opposite ends of the tanks B, B', are supported upon the elbows of the steam inlet and exhaust pipes J, J', projecting from the rocking fitting K.

L, L', is a roller bearing, upon which the fitting K, rocks, journaled in a bracket bolted to the base plate:—the construction and operation of the rocking fitting through which steam passes from the boiler to the tank and the exhaust discharged therefrom, is similar to that of the fitting D, and its supporting roller bearing E, E', and therefore needs no further specific description.

M, M', denotes the cylinders of piston valves controlling respectively the admission of steam to the tanks and the delivery of exhaust therefrom.

N, and N', are the respective pistons, and n, n', rods pivoted to the pistons and to the brackets secured to the base plate, the construction and operation of these parts being similar to the valves controlling the admission of water to the tanks and its delivery therefrom.

O, and O', are gooseneck pipes located within the tanks respectively connected with the pipes J, and J', whereby steam pressure from the boiler is delivered into the tank above the water level therein,—and the exhaust discharged from the tanks.

P, denotes a pipe connection between the fitting K, and the steam space of the boiler, and P', an exhaust pipe leading from the fitting K, to the place of discharge.

P², is a check valve in line with the exhaust pipe, closing against the return of the exhaust.

Q, is a rocking arm having arc-shaped ends to alternately receive the tanks upon tilting.

R, R, indicates a pair of piston dash pots, the rods of which are connected respectively with the ends of the rocking arm Q, to relieve the impact of the tanks upon tilting.

S, S, denotes standards rising from the base plate in which the ends of the pipes I³, and P', are journaled. The pipes I³ and P', connected with the respective fittings D and K, rock in the standards S, S; while the pipes leading therefrom carrying the check valves I', and P², are stationary;—means being provided to insure against leakage between the pipes and the standards. Suitable connections (not shown), adapted to flex, join the pipes I² and P, with pipe connections leading to the boiler.

Having indicated the several parts by reference letters, the construction and operation of the apparatus will be readily understood. The trap is mounted above the boiler so that water delivered to it may pass by gravity into the boiler upon the admission of boiler pressure into the trap. Water from the returns is delivered by the pipe I, through the fitting D, past the piston valve controlling the passage through the pipe C, into the tank, and upon the latter filling, the weight of the water therein causes it to tilt closing the water inlet piston valve G, thereby shutting off further admission of water to the filled tank, simultaneously opening the piston valve G' controlling the delivery of water from the tank to the boiler;—while at the opposite end of the tank, the piston valve N controlling the admission of boiler pressure is opened to deliver steam from the boiler into the tank above the water level therein;—the exhaust piston valve N' being closed, the pressure in the tank being thus balanced with that of the boiler, the water will pass by gravity to the boiler as is well understood. Upon the tank B', filling with water sufficiently to overcome the weight of the twin tank B, it will tilt as before explained, shutting off the admission of steam from the tank and opening the exhaust piston valve to free the tank of the boiler pressure, that feed water or condensation from the heating system may again enter it. It will be understood that the piston valves controlling the admission of water and steam to the respective tanks and the discharge therefrom are alternately and reversely operated through the alternate tilting of the tanks. The jar incident to the impact of tanks due to their oscillation is absorbed by the piston dash pots R, R, connected with the rocking arm Q, the ends of which are arc-shaped to receive the tanks.

Having thus described my invention, what I claim is:—

1. In an apparatus of the character described, a pair of tilting tanks, oscillatable pipe fittings suitably journaled, a plurality of pipes adapted to support the tanks and connected with the pipe fittings, a plurality of piston valves respectively in line with the pipe connections for controlling delivery through the pipes adapted to be actuated by the oscillatory movement of the tanks, whereby the exhaust of one tank is released that feed water or condensation may enter the tank, simultaneously with the admission of steam or boiler pressure to the other tank, that the water contained in the latter may pass to the boiler.

2. In an apparatus of the character described, a base plate, a pair of tilting tanks, pipe fittings having trunnions on which the tanks are adapted to rock, bearings for supporting the trunnions of the pipe fittings, pipe connections between the tanks and the pipe fittings, and between the latter and a source of water supply and discharge for the exhaust, a check valve in line with the water supply pipe, a check valve in line with the exhaust pipe, a piston valve in line with each of the pipes leading from the pipe fittings to the tanks, rods respectively pivoted to the pistons and to the base plate, whereby upon the alternate tilting of the tanks, the valves are caused to alternately open and close for the discharge of exhaust and delivery of water to one tank, and the delivery of steam and discharge of water from the other tank.

3. In an apparatus of the character described, a base plate, a pair of tilting tanks, pipe fittings having trunnions on which the tanks are adapted to rock, pipe connections between the pipe fittings and the tanks, a roller bearing supported upon the base plate to receive the trunnions of the pipe connections, and a plurality of piston valves adapted to be actuated by the tilting of the tanks for controlling the passage through the respective pipe connections.

4. In an apparatus of the character described, a base plate, a pair of tilting tanks, pipe fittings having trunnions on which the tanks are adapted to rock, pipe connections between the pipe fittings and the tanks, a roller bearing supported upon the base plate to receive the trunnions of the pipe connections, a plurality of piston valves adapted to be actuated by the tilting of the tanks for controlling the passage through the respective pipe connections, and means for cushioning the impact of the tanks upon tilting.

In testimony whereof, I sign this specification in the presence of two witnesses.

THOMAS G. RAKESTRAW.

Witnesses:
S. E. THOMAS,
J. L. DUFF.